Nov. 10, 1953   F. R. THRESH   2,658,198
FASTENING INSERTING MACHINE
Filed Sept. 24, 1952   10 Sheets-Sheet 1

Inventor
Frank R.Thresh
By his Attorney
Thomas J Ryan

Nov. 10, 1953 F. R. THRESH 2,658,198
FASTENING INSERTING MACHINE
Filed Sept. 24, 1952 10 Sheets-Sheet 2

Inventor
Frank R. Thresh
By his Attorney
Thomas J. Ryan

Nov. 10, 1953 — F. R. THRESH — 2,658,198
FASTENING INSERTING MACHINE
Filed Sept. 24, 1952 — 10 Sheets-Sheet 3

Inventor
Frank R. Thresh
By his Attorney
Thomas J. Ryan

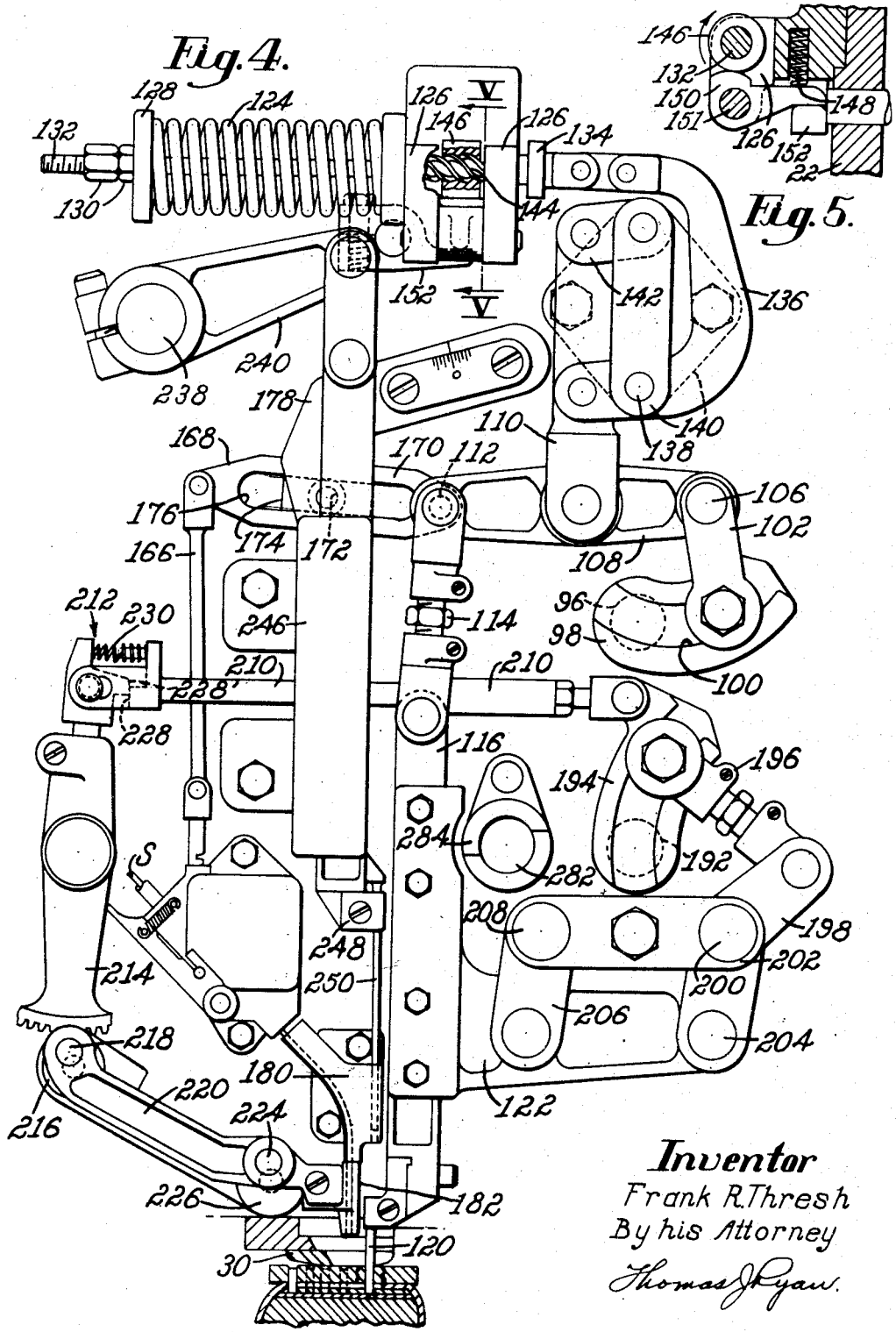

Nov. 10, 1953  F. R. THRESH  2,658,198
FASTENING INSERTING MACHINE
Filed Sept. 24, 1952  10 Sheets-Sheet 5
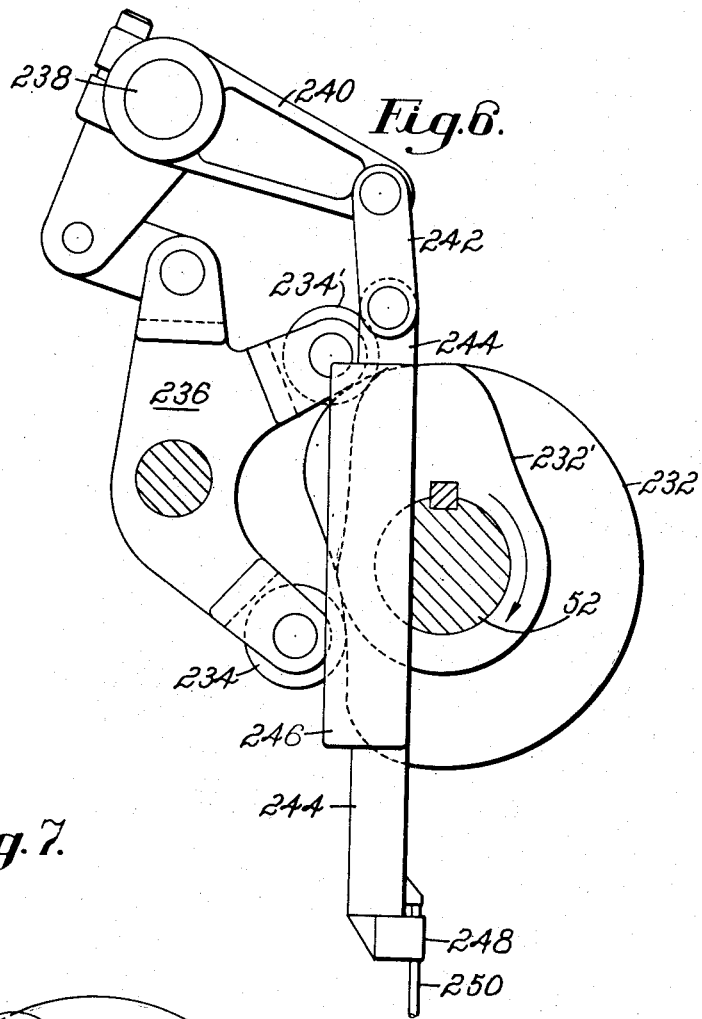
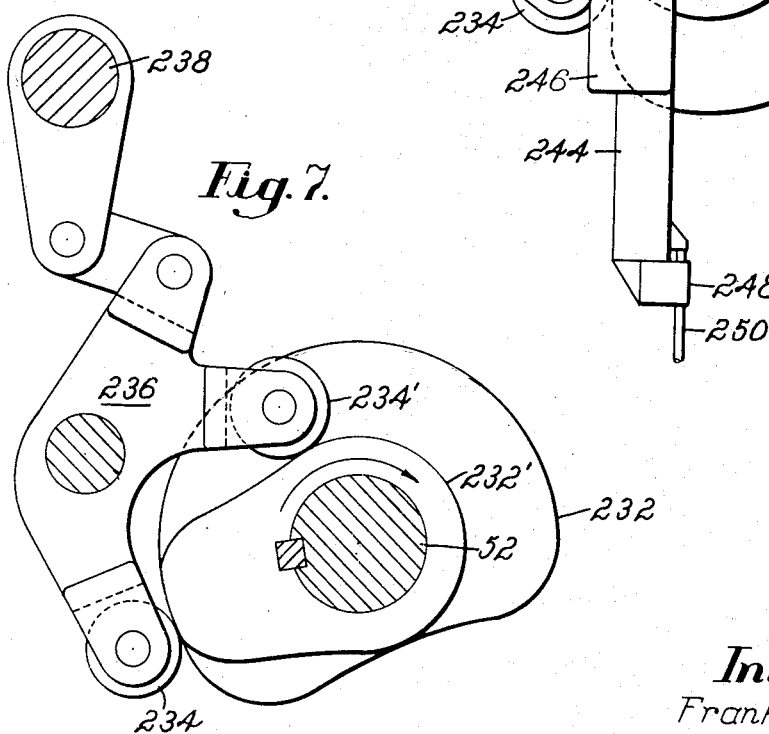
Inventor
Frank R. Thresh
By his Attorney
Thomas J. Ryan Nov. 10, 1953         F. R. THRESH         2,658,198
FASTENING INSERTING MACHINE
Filed Sept. 24, 1952                       10 Sheets-Sheet 6
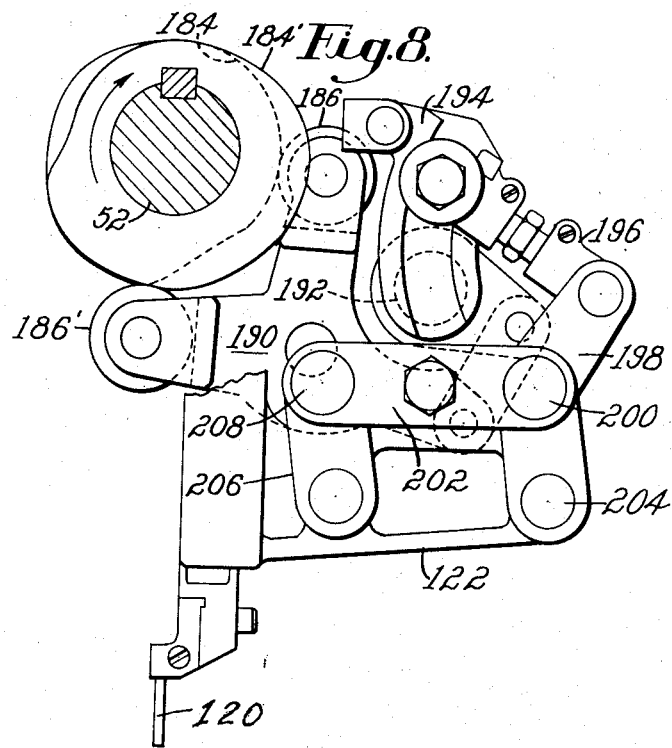
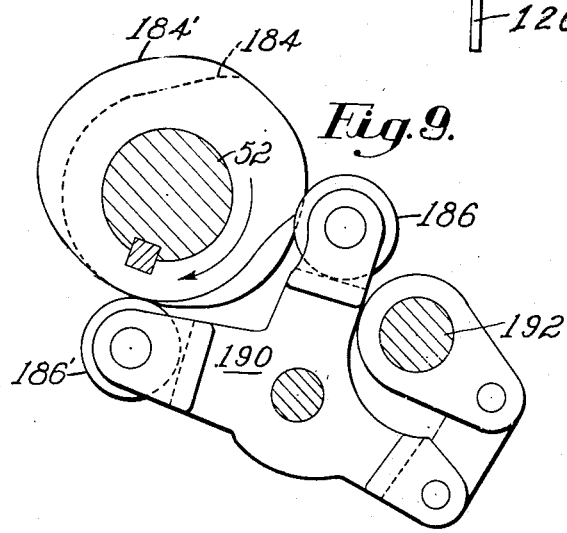
*Inventor*
Frank R. Thresh
By his Attorney Nov. 10, 1953 — F. R. THRESH — 2,658,198
FASTENING INSERTING MACHINE
Filed Sept. 24, 1952 — 10 Sheets-Sheet 7

Inventor
Frank R. Thresh
By his Attorney
Thomas J. Ryan

Nov. 10, 1953  F. R. THRESH  2,658,198
FASTENING INSERTING MACHINE
Filed Sept. 24, 1952  10 Sheets-Sheet 8

Inventor
Frank R. Thresh
By his Attorney
Thomas J. Ryan

Nov. 10, 1953  F. R. THRESH  2,658,198
FASTENING INSERTING MACHINE
Filed Sept. 24, 1952  10 Sheets-Sheet 9
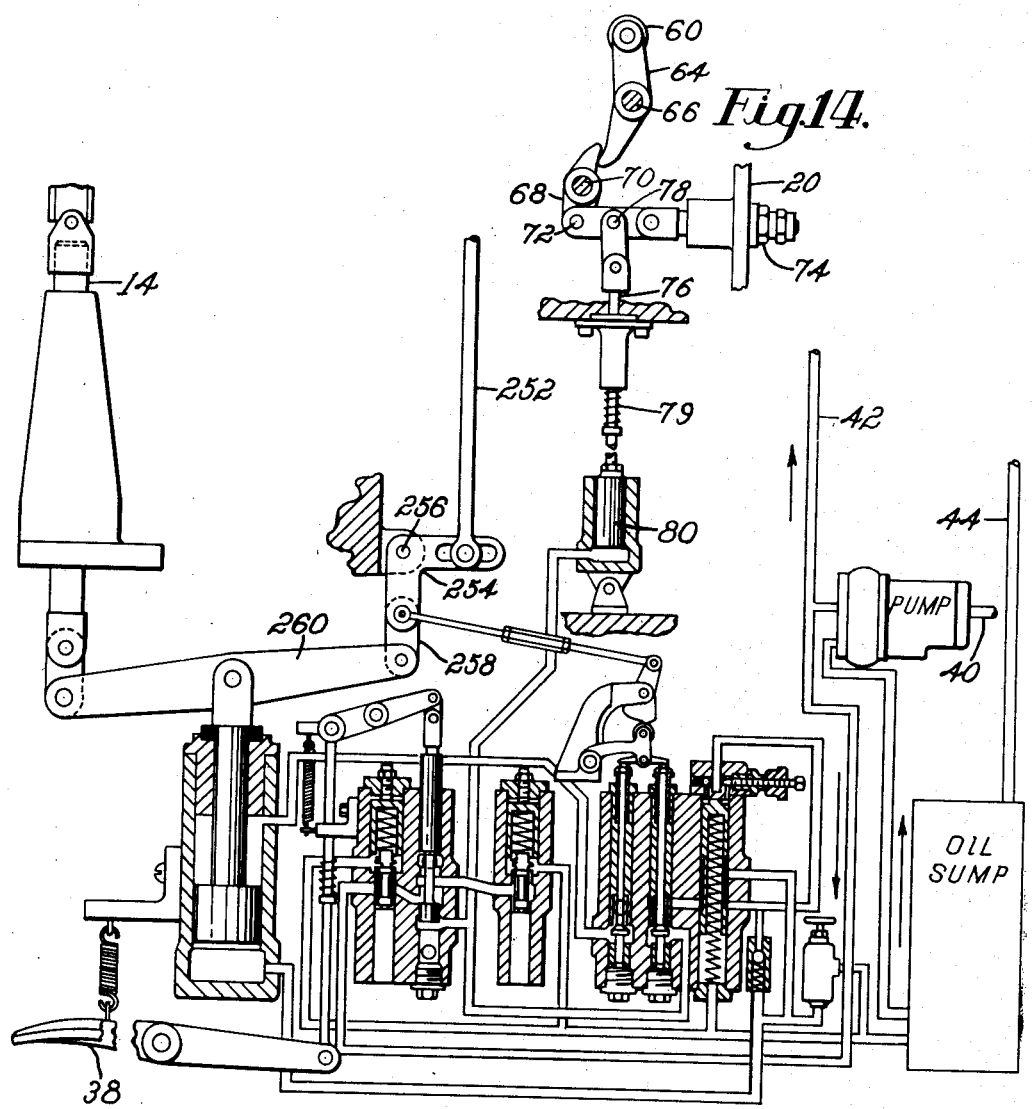
*Inventor*
Frank R. Thresh
By his Attorney

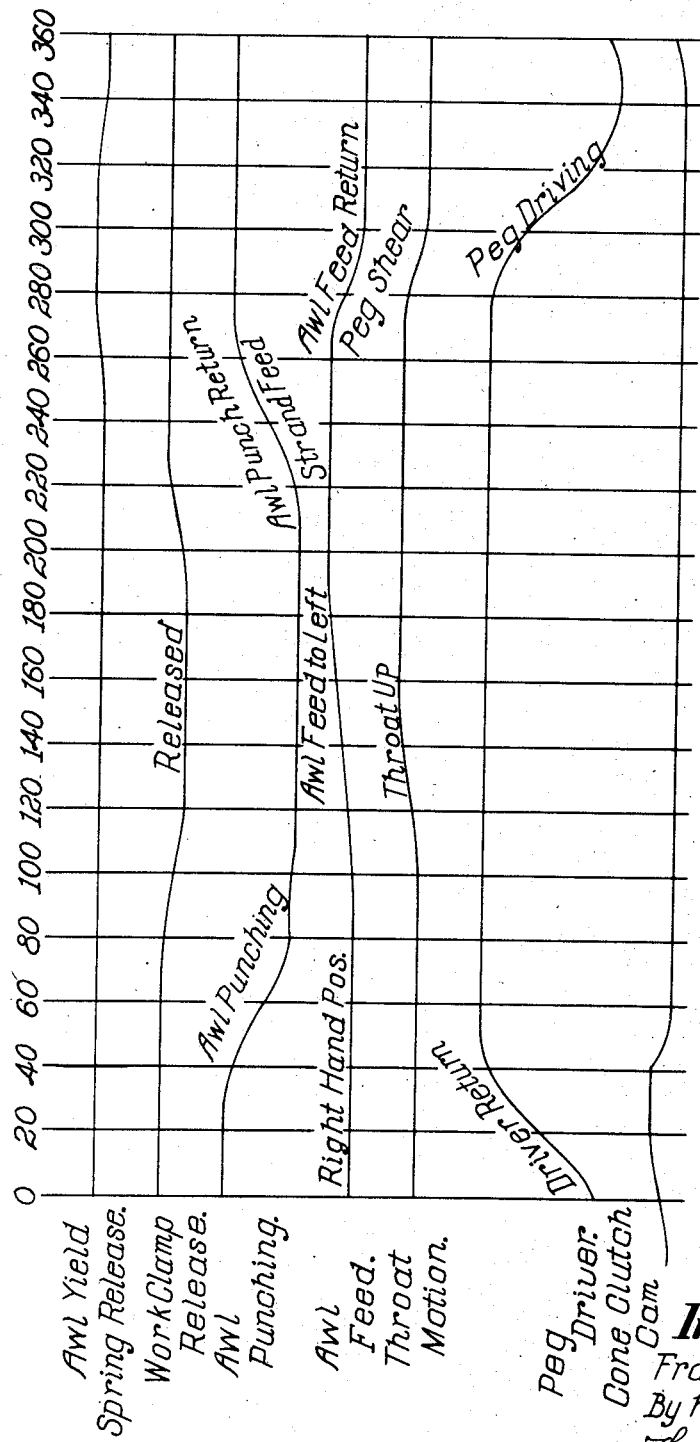

Patented Nov. 10, 1953

2,658,198

UNITED STATES PATENT OFFICE 2,658,198

FASTENING INSERTING MACHINE

Frank R. Thresh, Beverly, Mass., assignor to United Shoe Machinery Corporation, Flemington, N. J., a corporation of New Jersey Application September 24, 1952, Serial No. 311,251

5 Claims. (Cl. 1—30)

This invention relates to fastening inserting machines which operate to sever a peg from the end of a strand of material and to insert the peg fastener into a hole which has been prepunched by the machine through a plurality of work parts intended to be united by the fastener. In particular it relates to improvements in the art of automatic machinery for forming fastenings, from a strand such as fiber, to unite superimposed work layers wherein the thickness of any given layer may vary from point to point along the path of the work feed.

By way of example, the invention is illustrated as embodied in a shoe machine of the fastening inserting type disclosed in United States Letter Patent No. 2,541,132, issued February 13, 1951, on an application filed in my name in which type of machine the strand material for the pegs is intermittently fed from a supply reel into a movable peg throat member which forms a peg by shearing the fed length from the end of the strand and then conveys the peg to a position beneath the driver. The work parts, to be united after being pierced by an awl, are intermittently fed through the machine by the awl while it is punched into the work. The awl, after positioning the pierced portion in the path of the peg driver, is retracted preparatory to punching and feeding the work for the next fastening forming cycle of machine operation. While the invention is illustrated herein as embodied in a fastening inserting machine particularly adapted to drive fiber pegs into the sole portions of shoes, for example in heel seat pegging, it should be noted that the invention is not limited in its utility to such use or to embodiment in fastening inserting machines of the type illustrated and, accordingly, the construction disclosed herein should be regarded merely as one example of the forms in which my invention may be embodied.

Whereas the purpose of my above-mentioned patent was to provide improvements in the construction and operation of a hydraulic jack for clamping the work with relation to the fastening inserting instrumentalities of a fastener forming machine, my present invention is directed to novel improvements relating to the machine head containing the fastening forming and inserting instrumentalities themselves and also to improvements in the actuating mechanism for operating these instrumentalities. The general purpose of this invention is to provide a greatly improved machine operating head to be used in conjunction with my hydraulic jack mechanism. The numerous advantageous features of this head may be more readily appreciated after the following brief description of the various working instrumentalities and operational phases of my new automatic fastening machine.

The operating head is provided with a clutch-operated cam shaft completely enclosed within a sealed head housing. The clutch and brake mechanisms, for respectively starting and stopping the automatic operational cycles of the machine, are operated in time relation to the actuation of the hydraulic jack; the activating connections therebetween being similar to the arrangement disclosed in the machine of the above-mentioned patent; that is to say, there is a clutch controlling rod (corresponding to the rod 60, illustrated in Fig. 1 of the patent) for timing the starting and stopping of the machine head in response to the manual activation (through the treadle) of the work clamping jack. There is also a work clamp release controlling rod (corresponding to the rod 92 of the patent) for automatically effecting a release of the work clamping pressure during the work feeding phase of operation without the necessity of interrupting the continuous operation of the fastening inserting cycles of the machine head. At the front of the machine, and mounted on the outside of the sealed head housing, is an awl for first punching a hole through the work piece and then, before being withdrawn from the work, for feeding the work so as to position the hole beneath a peg and peg driver. The motion of this awl is downward to punch, sidewise to the left during the feeding phase, and then upward and to the right into retracted position. The movement of the driver, on the other hand, is restricted to reciprocatory movement in a fixed heightwise path. In addition to the awl and driver the machine is provided with means for feeding a measured length of strand and for severing the length to form a peg therefrom. The strand severing operation is accomplished by feeding the end of the strand from out of a fixed guide tube and into an adjacent movable throat member which then shears the strand by a transverse strand-displacing movement toward the right into position beneath the peg driver and immediately above the hole in the work piece. The driver then descends to drive the peg into the work and thus form a fastening. In the event that the work parts are to be secured together by a series of spaced apart fastenings, the operator maintains the treadle in its depressed position until the desired number of fastenings have been inserted, it being understood that as long as the treadle is depressed the clutch and brake mechanism associated with the cam shaft are maintained inoperative, allowing the machine continuously and automatically to perform several sequences of its fastening inserting operations.

Heretofore, one of the most objectionable features of peg fastening was that where the thickness of the work fluctuated, thus varying the depths of the awl hole, the pegs, when driven, were not uniform with respect to the surface of the work; in the case of a deep awl hole, such as encountered in the thicker work regions, the peg would be too short and hence would not, when driven, reach to the bottom of the hole; and conversely, where a diminution in the work thickness occurred, or where further penetration by the awl into the work was prevented by an obstruction such as the head of a lasting tack, the peg would be too long for the depth of the hole and, after being driven, this would result in an upstanding peg portion which protruded above the surface of the work. Accordingly, among the objects of the present invention is the provision of a machine capable of automatically supplying pegs of predetermined and varying lengths so that each awl hole, regardless of the depth of the awl piercing, will be supplied with a peg cut to the proper length to exactly fill the hole when completely driven.

Additional disadvantages experienced in the operation of previous fastening inserting machines of this type were that the machines were excessively noisy in operation and subject to rapid wear in their moving parts, especially in the numerous cams required for actuating the various operating instrumentalities of the machine. Heretofore such machines had many massive open-faced cams each provided with a follower roll alternately operating against the opposite walls of a groove in the cam. The shifting of the follower rolls from one side of the cam groove to the other, in addition to creating noise and vibration, produced a high degree of wear upon each cam and follower roll, due to the necessity for the roll reversing its direction of rotation each time such a shift took place. Accordingly, another feature of the invention is the reduction of noise and wear caused by the operation of the cam assemblies. To this end the machine is designed to be operated by a series of sets of conjugate cam assemblies, the provision of which not only permits the rolls to maintain contact at all times with the same cam surface and thereby continue to rotate in the same direction, but it reduces the mass of the rotating cam structures to approximately one-third of their former weight, thereby greatly reducing the torque produced in starting and stopping the machine. The thus prolonged life of the parts is not limited only to the cam assemblies, because this reduction of the mass of the moving parts also greatly reduces wear upon the clutch and brake operating mechanisms.

In addition the great mass of the intermittently moving parts of previous machines caused much annoyance due to the fact that, when the treadle was released to stop the machine, the drive shaft frequently failed to come to rest in the normal at-rest position, and an extra machine cycle resulted producing one fastening more than the number desired.

Another feature of the invention is that the automatic feed of the work can be regulated to vary the distance of the interval between successive fastenings.

These and other features of the invention will now be described in detail in connection with the accompanying drawings and will be pointed out in the appended claims.

Fig. 4 is a view similar to that of Fig. 3, but showing the position of the operating instrumentalities at the completion of the work punching and feeding phase;

Fig. 5 is an enlarged sectional view showing a detail of Fig. 4 taken along the line V—V looking in the direction of the arrows;

Fig. 6 is a detail illustration of the peg driver, its actuating connections and the driver cam assembly as viewed with the driver down in the at-rest position;

Fig. 7 shows the driver cam assembly as viewed when the driver is up and about to descend;

Fig. 8 is a detailed illustration showing the awl, its work feed actuating connections and the awl feed cam assembly as viewed with the awl elevated and in its right-most position (work not punched and not fed);

Fig. 9 shows the awl feed cam assembly as viewed at the completion of the feeding phase;

Fig. 14 is a schematic right side elevation, partially in section, illustrating the hydraulically operated work clamping and releasing mechanism; and Fig. 15 is a cam shaft time chart showing the relative positions of the various operating instrumentalities during an entire machine cycle.

*General organizaton of the machine*

Figure 1:
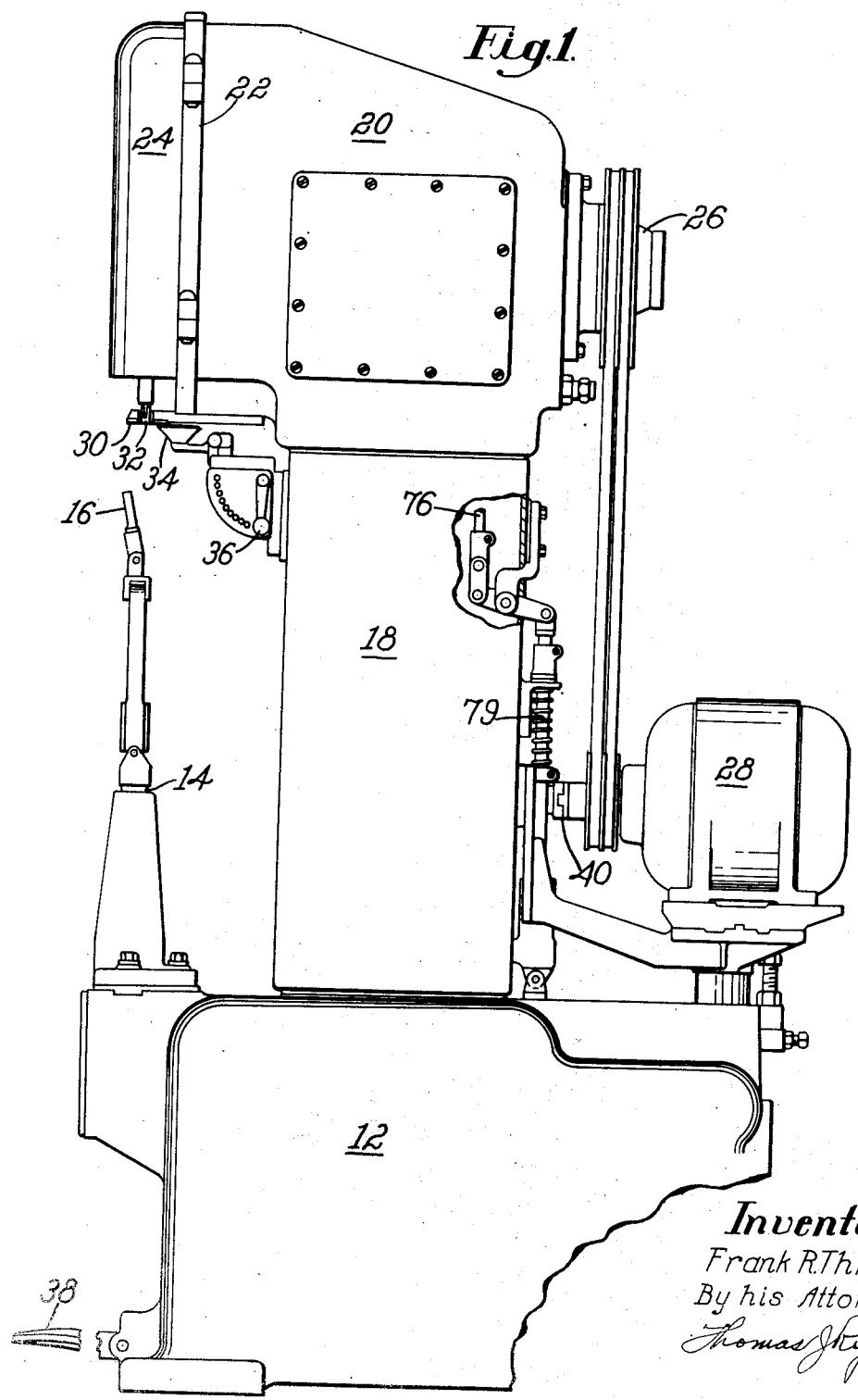
Fig. 1 is a view in right-hand side elevation of a fastening inserting machine constructed in accordance with my invention.

Referring to the drawings, and particularly to Fig. 1, wherein my invention is illustrated as embodied in a fastening inserting shoe machine adapted to insert fiber fastenings around the heel end of a shoe bottom to peg the heel seat portion of the sole to the insole and overlasted heel portion of the upper material, the machine frame is in part comprised of a base housing 12, within which is contained the hydraulically operated mechanism (Fig. 14) for controlling the heightwise movement of a work supporting and clamping member, herein represented as a jack post 14, surmounted by a jack post last pin 16 for positioning and clamping the bottom of a lasted shoe in proper position with respect to the machine operating instrumentalities. Extending upward from the base housing is a central frame column 18 upon which is supported a head housing 20 having a vertical front face plate 22 at each side of which there is hinged one of a pair of cover members 24 for enclosing the work operating instrumentalities which are mounted on the outside of the plate 22. At the rear of the head housing is a belt driven pulley assembly 26 for supplying power to the machine head from a motor 28 suitably supported on the lower frame structure. Extending outward from the front of the machine, so as to be positioned between the last pin 16 and the work operating instrumentalities, is a guard or pressure plate 30 providing a fixed abutment against which the work may be clamped upward during the hole punching and peg driving cycles of the machine. This plate 30 has a vertical opening therethrough in the form of a slot 32 to provide access to the work for the work operating instrumentalities, two of which are shown extending through the opening. Beneath and adjacently rearward of the opening is a horizontally rotatable work gage 34, the work engaging position of which can be adjusted by a handle 36 to accommodate different work conditions, such as small or large heel ends. An operating treadle 38 (shown broken away at the lower front of the machine) controls the automatic operation of the machine through the actuation of the hydraulic system as described in the previously mentioned patent and as schematically illustrated herein by Fig. 14. The power for this hydraulic system is also derived from the motor 28 through a coupling 40 connected directly to a pressure pump which also provides pressure to an oil spray bath lubricating line 42 located within the upper region of the head housing 20 so as to direct streams of oil upon the parts therein requiring lubrication. It is to be understood that the housing 20 is completely sealed, with the exception of the just-mentioned lubricating line 42 and an oil return line 44 leading from the bottom of the machine head down to an oil reservoir in the base of the machine, there being suitable gaskets and oil seals provided about each opening through or juncture in the outer shell of the head housing member.

The arrangement of the power transmitting parts within the head housing consists of a main power cam shaft driven through a clutch and carrying thereon four sets of conjugate cams, one set for imparting the punching action to the awl, a second for moving the awl to feed the work, a third set for operating the driver and a fourth set for actuating the work clamp release mechanism; also carried on the power cam shaft is a clutch actuator having an open faced cam against which a treadle operated pressure roller may be brought to bear to cause the disengagement of the clutch and simultaneously to cause a braking action on the power cam shaft so as to stop the operating parts of the machine head in the at-rest position.

*Power cam shaft clutch*

Figure 2:
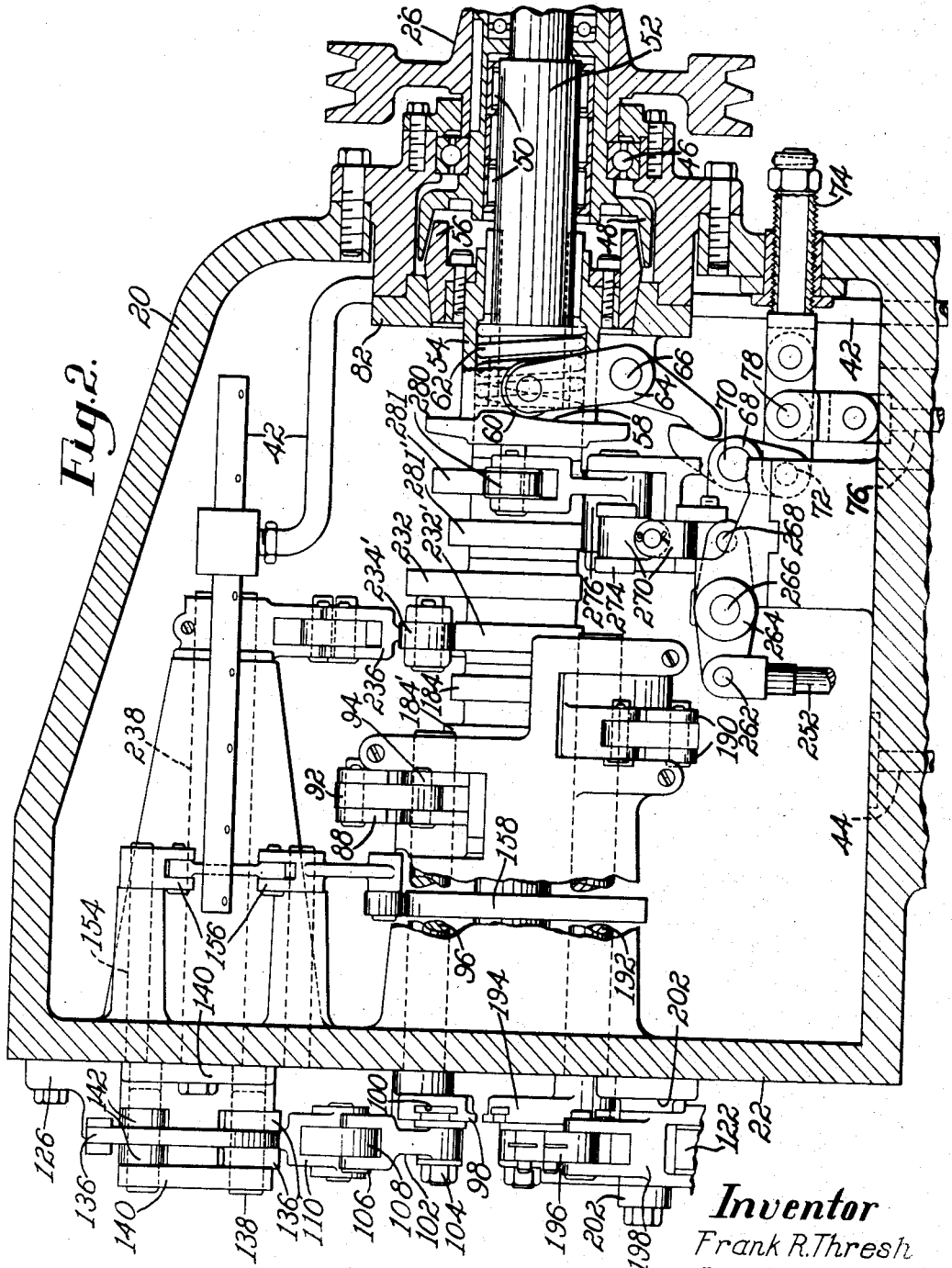
Fig. 2 is a right-hand side elevation of the machine operating head with portions thereof in section and viewed in the at-rest position of the machine.

Referring now to Fig. 2, in which the parts are illustrated in the at-rest position, the hub of the pulley assembly 26 is supported within a rear opening in the housing by ball bearings 46, and the hub extends into the housing and has a driving clutch member 48 formed integrally on the inner end thereof. This hub is in the form of a hollow sleeve within which are two spaced-apart sets of needle bearings 50 fitted around a main power cam shaft 52, whereby a rear supporting bearing is provided for the shaft while permitting independent rotation between the pulley and a shaft. Keyed to the shaft 52, as to be axially slidable with respect to the shaft, is a clutch actuator sleeve 54 carrying affixed to one end thereof a driven clutch member 56 which alternately serves as a brake engaging member. Formed on the other end of the actuator sleeve is a clutch disengaging cam 58, which, when the rotation of the shaft approaches the at-rest position, will bear against a pressure roller 60 provided that the treadle has been released to lock the roller in the path of the cam in a manner which will be explained hereafter. The actuator 54 is spring biased toward the driving clutch member 48 by a coil compression spring 62 nested between the sleeve 54 and the shaft 52 with one end of the coil bearing against a shoulder on the shaft and the other end against a shoulder within the sleeve. The roller 60 is mounted on one end of a bell crank lever 64 which in turn is attached to a fixed portion of the housing by a pivot 66. The other end of this lever extends downward as to be positioned in the path of movement of a second lever 68 medially mounted on a fixed pivot 70. The lever 68 is actuated by a toggle link connection attached to the lower arm of this lever by a free pivot 72, the other end of the toggle connection being pivotally secured to a fixed adjustment screw 74. A vertically movable clutch toggle release rod 76 (equivalent to the rod 60 illustrated in the above-mentioned patent) is attached to the center of the toggle connection by a free pivot 78, and, as illustrated herein in Fig. 14, this rod 76 is raised, to break the toggle and engage the clutch, by a clutch-operating piston 80 the actuation of which is identical to that of the piston 190 as described in the prior Patent No. 2,541,132. As illustrated in Figs. 2 and 14, the rod 76 has been pulled down by reason of the operator having taken his foot off the machine operating treadle thereby allowing a return spring 79, acting upon the rod and set to overcome the low pressure of the hydraulic system, to lower the clutch control release rod thereby straightening and locking the toggle connection. During the locking of the toggle, the lever 68 must move clockwise against the lower arm of the lever 64 thereby forcing the roller 60 in a counterclockwise direction into a locked position so that continued rotation of the clutch cam 58 causes the clutch actuator to slide toward the left against the compression of the spring 62 thereby shifting the clutch member 56 out of engagement with its driving member 48 and into engagement with a fixed frictional ring 82, contact with which brakes the power cam shaft to a stop. From the foregoing it will be understood that an elevation of the rod 76, by depressing the treadle 38, breaks the toggle upward, thereby releasing the roller 60 from its locked condition and allowing the actuator to be moved by the spring 62 into engagement with the driving member 48 to cause the cam shaft 52 to rotate. The adjustment screw 74 permits periodic adjustment of the toggle links to compensate for wear in the parts which might otherwise prevent the toggle from functioning as above described.

*Awl punching*

Figure 10:
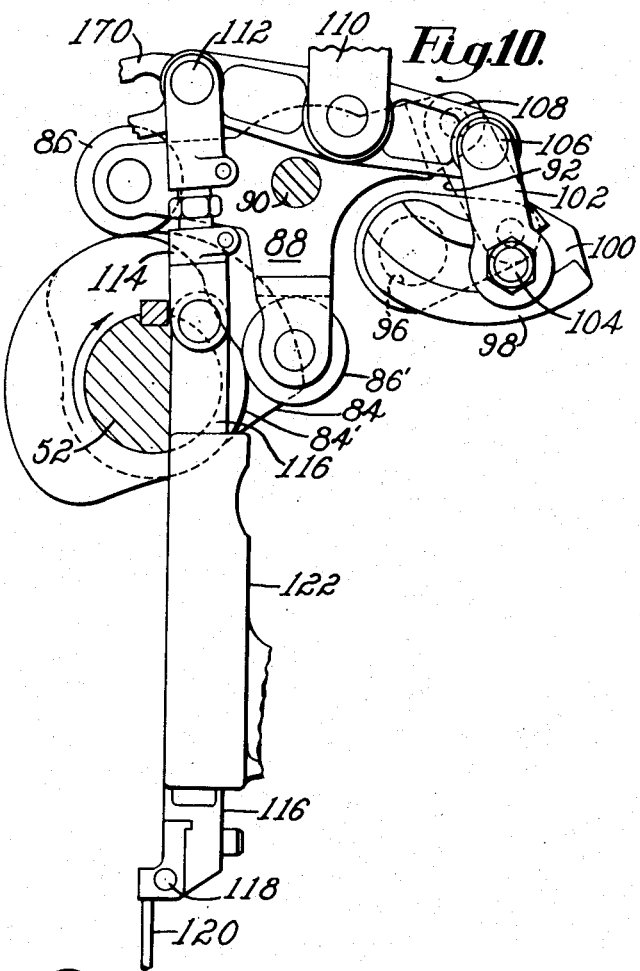
Fig. 10 is an illustration showing the awl and its punch driving mechanism as viewed before the punching and feeding operations (at-rest position)
Figure 11:
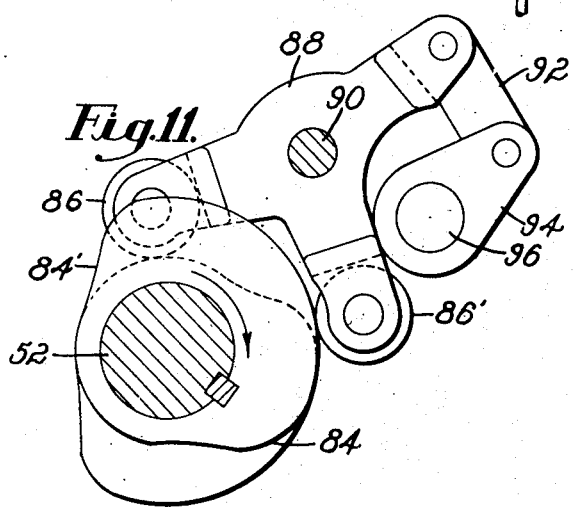
Fig. 11 shows the awl punching cam assembly as viewed after the punching operation and before the commencement of the awl feed.

The intermittent vertical punching movement of the awl is derived from a conjugate cam assembly keyed to the shaft 52. This assembly comprises a pair of complementary cams 84, 84', each having a follower roll 86, 86', movably associated therewith. As may be seen best from the illustrations of Figs. 10 and 11, these follower rolls are each mounted on adjacent arms of a T-shaped bracket 88, the respective arms of which are bifurcated at their ends and offset axially of the rolls to permit each roll to bear against its cam. The bracket is pivotally mounted toward its center upon a countershaft 90 and the third arm of the bracket carries a pivotal connecting link 92 which in turn is attached to a bifurcated lever arm 94 fixed on a rocker shaft 96 which is suitably journaled in the housing frame and has a forward end extending through the front face plate 22. Rotation of the work cams 84, 84', from their at-rest position, shown in Fig. 10, to the position in Fig. 11 representing the completion of the punching phase, produces a counterclockwise rocking of the bracket 88 about its pivot 90. This rocking in turn imparts, through the link 92 and lever 94, a counterclockwise rocking movement to the shaft 96 and it is this rocking movement which is employed to actuate the awl during its punching stroke.

Integrally formed on the forward end of the rockershaft 96 adjacent the front side of the face plate 22 is a quadrant-shaped arm 98 having a slide groove 100 of T-shaped cross section formed longitudinally therein. A link 102 is adjustably positioned and attached at one end to the arm 98 by means of a bolt 104 provided with a nut and having a T-head slidable along the groove 100 to adjust the extent of throw to be imparted to the upper end of the link 102 by the oscillation of the arm 98. The upper end of link 102 is attached by a pivot 106 to one end of a two-armed lever 108, pivotally suspended at its center from a vertically yieldable member 110. The other end of the lever 108 carries a pivot 112 to which is flexibly linked a connecting rod 114 directly connected to the top of an awl carrier bar 116, having an awl clamp 118 and an awl 120 at the lower end thereof. The carrier bar 116 is guided in its travel by a guide housing 122 remotely pivoted to a fixed portion of the machine. The construction and reason for this pivotal feature of the carrier bar slide 122 will be described later in connection with the awl feeding operation. It will be clear from the preceding description that upon the rocker shaft 96 being moved counterclockwise by the cam assembly, the awl will be impelled downward into the workpiece.

*Awl yield spring and strand feed mechanism*

Figure 3:
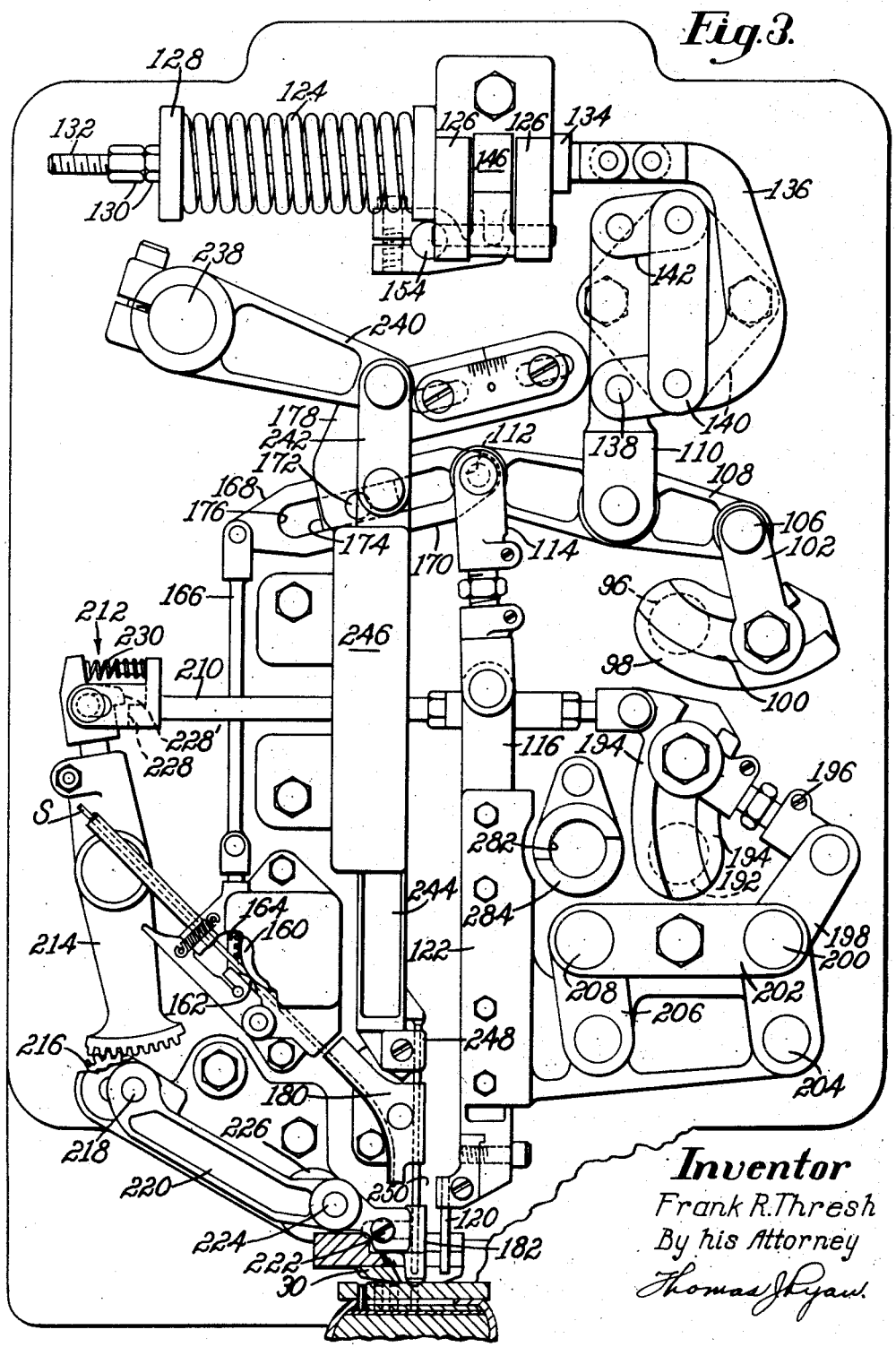
Fig. 3 is a front elevation of the operating head showing the fastening forming and inserting instrumentalities in their at-rest position.

As previously stated, the degree of penetration of the awl into the work must be accurately recorded and measured in order to control the length of peg to be cut and driven into the awl hole. In accordance with this feature of the invention the machine intermittently feeds the strands into the peg severing throat during the return or elevating movement of the awl, and the strand feeding device is only actuated to the degree that is necessary to retract the awl. As will be described later in more detail, the strand is fed by a Horton clutch device and while the feeding actuation of the clutch is derived from the return stroke of the awl, yet the extent of this stroke is determined by the depth of the punching stroke. Thus, if an obstruction is encountered which terminates the piercing action of the awl, further downward awl movement must be arrested. To this end there is a yielding mechanism which allows the cam driven rockershaft 96 (see Figs. 2, 3 and 4), to complete its counterclockwise movement without positively exerting a downward driving force upon the awl after it encounters substantial resistance to further penetration. The vertically extending member 110, the lower end of which provides a medial fulcrum support for the lever 108, is yieldably supported through a pantograph-like linkage to provide a floating fulcrum which is permitted to yield upwardly against the force of a spring when the awl encounters sufficient resistance to overcome the spring. One end of this spring 124 bears against the side of a fixed abutment in the form of a bifurcated boss 126 extending forwardly from the face plate 22. The other end of the spring is confined within a cup-shaped member 128 adjustably positioned by lock nuts 130 on the threaded end of a tension rod 132, which extends through the coil of the spring 124 and transversely through the bifurcated boss 126, which acts as a bearing through which the rod may move horizontally. Adjacent the right side of the boss 126 the rod is provided with a stop collar 134 for limiting movement of the rod in the direction of the spring. The right-hand end of the rod is linked to the upper end of a downwardly curved lever arm 136 which, toward its lower end, is attached by a fixed pivot 138 to a boss 140 projecting from the face plate and having a slot for the reception of the lever arm 136. The lower end of the arm 136 is pivotally attached to an intermediate portion of the yieldable member 110. The upper end of the member 110 is pivotally attached to a link 142 which in turn has its other end pivotally secured within another slot in the top of the boss 140, thus forming a pantograph to maintain the vertically movable member 110 in substantal alinement. The compression of the spring 124 is adjusted by the nuts 130 so as to tension the rod toward the left as shown in Fig. 3. In this position the yielding fulcrum for the rockershaft lever 108 is in its lowermost position. When, however, the awl strikes an obstruction, the remaining awl driving throw of the link 102 will be expended by lifting the member 110 against the force of the spring 124 thereby drawing the rod 132 toward the right as shown in Fig. 4. In order to lock the rod in its right-hand position and thus prevent the awl from further downward movement (when the work clamp is released preparatory to feeding the work), there is a monkey-lock arrangement which freezes the rod against retrograde movement until a latch is released. Referring to Figs. 4 and 5 it will be seen that a spiral worm 144 integral with a portion of the rod 132 is geared axially to a roller 146 which is restrained from free axial movement with respect to the rod by reason of the fact that the sides of the roller are confined between the bifurcation of the boss 126, thus axial movement of the rod may not take place without an accompanying rotation of the roller 146. Adjacent the peripheral surface of the roller and pressed thereagainst by a spring 148 (Fig. 5) is a monkey-lock wedge member 150 pivoted to the boss at 151 so as to bind the roller 146 against rotation in a direction which would permit retrograde movement of the rod toward the left, but which does not interfere with rotation of the roller in the direction of the arrow in Fig. 5, as required to permit a yielding of the awl driving and strand measuring mechanism. After the awl elevation and strand feeding have commenced, the roller 146 is released by pivoting the locking member 150 out of contact with the roller 146, thus allowing the spring 124 to retract the rod 132 and restore the fulcrum for the awl operating lever 108 to its original level. The release of the locking member 150 from the pressure of its spring 148 is accomplished, after the strand has been measured, by the lifting movement of an automatically activated latch release finger 152 extending transversely from a rockershaft 154 journaled through the front face plate and, within the head housing, carrying a suitable actuating linkage 156, Fig. 2, controlled by a cam 158 keyed to the cam shaft 52.

Now referring to Figs. 3 and 4, the actual feeding of the strand S is accomplished by the rotation of a feed roll 160 against the periphery of which roll the strand is frictionally pressed by a pressure roll 162. The feed roll is intermittently driven in a counterclockwise direction through a Horton clutch, parts of the driving teeth for which, may be seen in Fig. 3, engaged with a toothed rack 164 which is vertically moved by a pivoted link rod 166 having its upper end attached to an arm 168 of a rocking lever the other arm of which, 170, is fastened to the pivot 112. The medial fulcrum point 172 for this lever is adjustably fixed by means of a slide block 174 fitted within a longitudinal slot 176 in the lever and pivotally supported against vertical movement by a bracket 178 adjustably bolted to the face plate. It will be apparent from the foregoing description that the toothed rack 164 moves simultaneously with, but in the opposite direction from the movement of the awl carrier bar 116 because they are both driven by the movement of their common pivot 112. The slot 176 and cooperating slide arrangement is for the purpose of compensating for any horizontal shifting of the pivot 112 as required when the awl yield mechanism is actuated. It is to be understood that, although the rack 164 is elevated during each awl punching stroke, it is only effective to rotate the feed roll upon being lowered by the awl retracting mechanism. When this takes place, the feed roll 160 advances the strand through a downwardly curved passage in a fixed guide block 180 and into the vertical bore of a movable throat member 182. Upon the completion of the strand feeding operation, the throat 182 is actuated horizontally toward the right, by a mechanism which will soon be described in connection with the work feeding operation of the awl. This transverse movement of the throat out of alinement with the bore 180 severs the strand to form a peg.

*Awl work feed mechanism*

As will be seen from Figs. 2, 3, 4, 8 and 9, the construction and arrangement of much of the actuating mechanism for feeding the work is practically identical with the actuating mechanism described above in connection with the operation of the awl in its punching stroke. Within the head housing, a conjugate cam assembly, comprising a pair of cams 184, 184' keyed to the shaft 52, with their associated follower rolls 186, 186', rocks a bracket 190 which in turn rocks a shaft 192 extending through the face plate 22 and having formed integrally on the front end thereof a quadrant arm 194. This arm, in the same manner as the arm 98 of Fig. 10, is provided with means whereby the effective throw of the arm may be regulated, but in this instance, in order to vary the distance of the work feed between successive pegging operations. An adjustable link 196 connects the arm 194 to the upper arm of a bell crank lever 198 which is pivotally mounted at 200 to a fixed boss 202. The lower arm of the lever is attached by a pivot pin 204 to a portion of the awl guide housing 122. Also pivotally attached to the housing, so as to form a pantograph, is another link 206 secured at its upper end to the fixed boss by a pin 208. The operation of the awl feed cam assembly causes an oscillatory movement of the lever 198 in a clockwise direction from the position illustrated in Figs. 3 and 8 to that as illustrated in Fig. 4. As may be seen, this in turn causes the guide for the awl carrier bar to be shifted horizontally toward the left thereby feeding the work through the medium of the awl 120 which has previously been punched into the work.

Besides causing a transverse shifting of the awl, the clockwise rocking of the arm 194 simultaneously actuates the strand-severing and peg-feeding movement of the throat member 182. Referring to Figs. 3 and 4, it will be seen that a horizontally extending rod 210 connects the power driven arm 194, through a yielding lost motion connection 212, to the upper end of a pivoted leg 214 on the foot of which is formed a gear segment whose teeth are meshed with those of a driven gear wheel 216, so that a swinging movement of the leg 214, as caused by the power driven arm 194, will impart a movement to the gear wheel 216 which is rotatably mounted to a fixed portion of the machine. This wheel carries an eccentric crank pin 218 pivotally connected to the upper end of an inclined arm 220 on the lower end of which the throat member 182 is clamped by a screw 222. The arm 220 is similarly connected adjacent its lower end to an eccentric pin 224 carried by a rotatable wheel 226 mounted on a fixed pivot, so that the wheels 216 and 226 move concomitantly to maintain the bore of the throat in a vertical position at all times. The horizontal travel of the rod 210 is sufficient to impart to the wheels 216 and 226 more than a 90° turning movement in order to assure that the throat and peg are completely lowered upon the work surface even though the top level of the work may be slightly beneath the guard plate 30. In order to provide a yield for the movement of the rod 210 toward the left in excess of the amount required to carry the throat from its elevated peg-receiving position of Fig. 4 to its peg-driving position as shown in Fig. 3, the connection 212 positively swings the leg 214 counterclockwise until the abutting shoulders 228, 228' are pivoted out of contact with one another, whereupon further movement of the rod 210 toward the left merely drives the throat yieldingly downward by reason of the compression of a spring 230 in the connection 212.

*Peg driver actuating mechanism*

Referring to Figs. 2, 6 and 8 which illustrate the actuating connections from the cam shaft 52 to the peg driver, it will be recognized that here again the arrangement of the power driven parts within the head housing is quite similar in construction to those as previously described in connection with the operation of the awl in both its punching and feeding phases. A conjugate cam assembly, comprising a pair of complementary work cams, 232, 232', keyed to the shaft 52, and their associated follower rolls 234, 234', rocks a pivoted bracket 236 which in turn rocks a shaft 238 extending through the face plate 22 and having affixed on the front end thereof a lever arm 240, the right-hand end of which is pivotally connected by a link 242 to the upper end of a driver carrier bar 244. This bar 244 is vertically guided in its travel by a stationary driver guide housing 246 bolted to the face plate. To the lower end of the carrier bar 244 is secured a clamp 248 for holding a peg driver 250. Thus a clockwise rocking of the shaft 238 impels the driver 250 from its elevated position, as shown in Fig. 4, to the fully driven position of Fig. 6. As may be seen in Fig. 3, the driver 250 is laterally supported during its driving strokes by a closely fitting bore extending vertically through the fixed guide block 180.

Work clamp release mechanism

Figure 12:
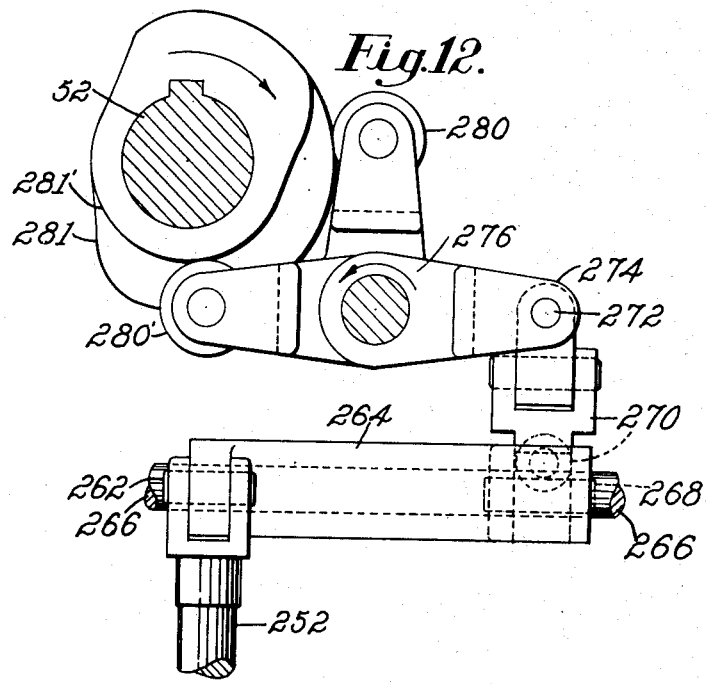
Fig. 12 illustrates the mechanism of the work clamp release cam in its locked position.
Figure 13:
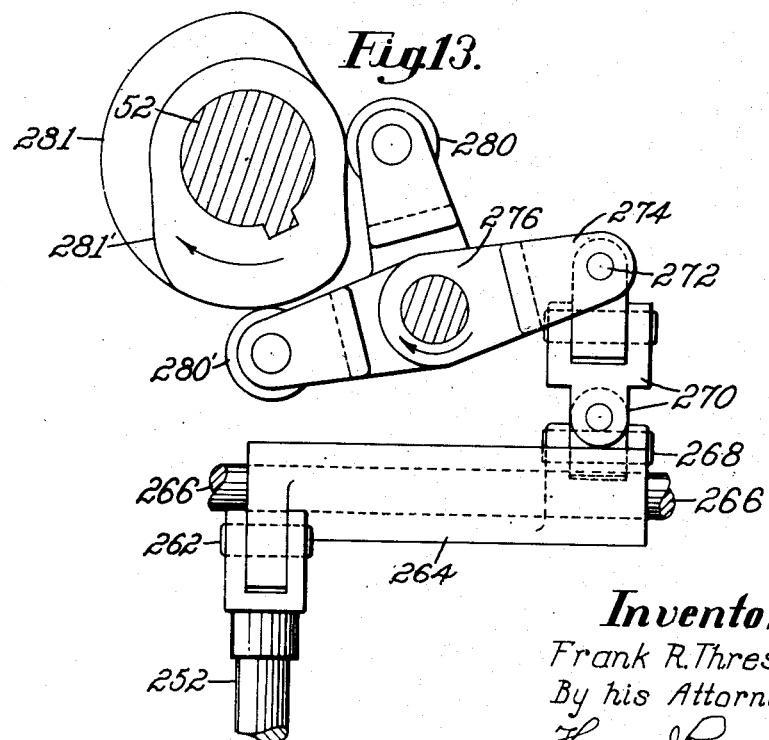
Fig. 13 shows the clamp release mechanism in its unlocked position.

It has been mentioned that the work is intermittently fed, there being one feed movement during each cycle of operations. In order to permit the work to be fed, it is, of course, necessary temporarily to release its clamping engagement with the pressure plate 30 by a short downward movement or dip of the jack post 14. In order to effect this temporary dip in the jack post just before and during the work feeding actuation of the awl, there is a vertically movable cam-controlled rod 252 (Figs. 2 and 14) the lower end of which is attached to the horizontal arm of a bell crank lever 254. This lever is mounted for swinging movement on a fixed pin 256, and the vertical arm of the lever is connected, by a pivotal link 258, to one end of the jack post actuating lever 260. As will be noted, the link 258 and the vertical arm of the bell crank lever constitute a toggle which is made or broken, by swinging movement of the bell crank lever about its pin 256, under the control of the rod 252. The upper end of the rod is pivotally secured by a pin 262 (Figs. 12 and 13) to one end of a rocking lever 264 mounted for swinging movement about a fixed pin 266. The other end of the lever 264 is pivotally linked by a pin 268 to a universal joint 270 connected in turn by a pivot pin 272 to a bifurcated arm 274 on a pivotally mounted cam follower bracket member 276. A pair of follower rolls 280, 280', mounted on separated divergent arms of the bracket, each bear against one of a pair of complementary conjugate cams 281, 281', keyed to the shaft 52. Just prior to the work feeding operation of the machine the rotation of the cams rocks the bracket 276 in a counterclockwise direction thereby depressing the rod 252 to break the toggle arrangement by which the rod is connected to the jack post supporting lever 260. The above-described operation of the rod 252 for releasing the clamping pressure of the jack post is the same as the operation of the clamp release rod 92 of Patent No. 2,541,132 and, since this present invention is not concerned with the construction of the jack operating mechanism, reference may be had to said patent for further details relating to any hydraulic phases of operation.

It is to be noted that a means is provided for manually rotating the cam shaft 52 to any desired position, such as may be required for adjusting or removing parts of the machine. This consists of a rotatable shaft 282, Figs. 3 and 4, slidably journaled through the face plate 22 and having formed integral with its forward end an annular crank handle engaging sleeve 284. The portion of the shaft extending within the head housing carries a gear wheel (not shown) engageable with a larger gear wheel keyed to the shaft 52. The cranking shaft 282 is normally spring biased axially into a forward position in which the said gear wheels are disengaged from one another, so that the shaft 282 is not rotated in the normal operation of the machine. In order slowly to jack the machine over by hand, the operator presses the crank handle rearwardly against the shaft thus shifting the small gear into engagement with the larger so that the operating instrumentalities may readily be actuated through a reduction gear train when the handle is cranked to bring the moving parts to their desired locations.

Sequence of operations

Having separately described in detail the construction and operation of the individual work operating instrumentalities and their associated parts, the description which follows will suffice to enable one to comprehend fully the automatic operation of the machine as a unit throughout a complete operating cycle. Referring now to the cam time chart of Fig. 15, and also to Figs. 2 and 3 which show the machine in the at-rest position, it will be seen that before the treadle 38 is depressed, the driven clutch member 56 is disengaged from its driving member 48. Also as viewed from the front of the machine (Fig. 3), the awl 120 is fully elevated and in its rightmost position, thus providing adequate clearance between it and the top surface of the workpiece to be inserted or removed. The peg shearing and driving throat 182 is in its downward and rightmost position, it being held down yieldably by the force of the spring 230. The peg, driven from the throat during the previous operation of the machine, may be seen set in the workpiece and still in alinement with the driver 250 which has risen slightly in order to be clear of the work. While the work is illustrated in Fig. 3 as locked up against the plate 30, it is to be understood that when the treadle is released the work is thereby lowered. In this regard Fig. 3 represents the parts of the machine when the cam shaft 52 is in its zero degree position between successive automatic cycles of operation, and when the work clamp release is therefore locked in its upper position, whereas Fig. 2 represents the machine parts actually at rest after the brake has been applied by the release of the treadle.

While the machine is inoperative in its at-rest position, the operator places the work between the fixed holddown guard plate 30 and the vertically movable work clamping member beneath said plate. The operator partially depresses the treadle to clamp the work piece against the guard plate with a light clamping pressure. If the work then is not properly positioned, he may still manipulate the work into proper position. He then fully depresses the treadle, keeping a foot on the treadle until the desired number of fastenings have been inserted into the workpiece. Full depression of the treadle causes the work to be clamped with great force and locked in operative position with the toggle link 258, of Fig. 14, in straight-line relation to the lower arm of the work clamp release lever 254. Upon completion of this first manually activated locking movement of the vertically movable clamping member, the automatic sequence of the fastening inserting operations of the machine commences as follows: the brake is released and the clutch engaged to rotate the power cams. With the awl yield spring mechanism locked, the awl is driven downward punching a hole into the work piece until it strikes the heel plate, or a lasting tack. Upon encountering such an obstruction in its path, the awl yielding compression spring mechanism absorbs the continuing movement of the positively driven awl driving connections, and the depth of the awl penetration at the completion of its effective downward stroke is ascertainable by the extent, if any, to which the spring 124 is compressed, and this information is temporarily recorded by the locking of said mechanism in its compressed condition. During the awl punching phase of operation the peg driver is being elevated to its topmost position so as not to obstruct the following operation of the awl which is the feeding of the work toward the left of the machine to position the punched hole into alinement beneath the driver. However, before work can be fed sidewise into the peg receiving and driving position, the work clamping member (which may be a jack post last pin or, in the case of "off-the-last" work, a horn member) must first be released thus allowing the jack post or horn member to dip slightly downward. This release of the full work clamping pressure takes place after the punch movement of the awl and before the work feeding movement commences. During this feeding phase the awl remains depressed within the hole so that the sidewise movement of the awl will slide the work to the left until the awl and hole are directly beneath the peg driver. Also during the feeding of the awl the throat 182 is elevated upward and to the left to provide clearance for the awl as it feeds the work (see Fig. 4). It will be noted that the peg driver has already been elevated clear of the throat member before the member moves to the left into strand receiving position. At the completion of the awl feeding operation the work clamp is again locked in its uppermost position to hold the work tightly upward against the plate 30. Thereafter the awl commences its upward movement and simultaneously the strand feeding actuation of the feed wheel 166 commences. It is to be noted from the awl yield spring release chart of Fig. 15 that the spring 124 is not released until the awl has been substantially raised thereby measuring the strand feed in accordance with the depth of the preceding awl penetration. At the completion of the strand feeding, the throat 182 is actuated to sever the peg by a rightward movement and simultaneously the awl is moved out of the way toward the right. After the peg has been sheared, the throat moves with the peg from its position in Fig. 4 to that in Fig. 3, and the driver then descends to insert the peg into the work piece. If it is desired to continue to drive a sequence of pegs the operator continues to keep the treadle depressed, whereupon the just-described cycle of operations will be repeated until a sufficient number of fastenings have been formed and inserted, at which time the release of the treadle, as previously explained, will bring the machine to rest and cause the work clamp to be lowered thereby freeing the work from the machine.

Having thus described the invention, what I claim as new and desire to secure by Letters Patent of the United States is:

1. In a fastening inserting machine having means for progressively operating upon a work piece to insert therein a series of fiber pegs, said means including strand feeding mechanism, a driving throat operatively associated with said mechanism first to receive a length of fiber strand and then to shear the strand to form a peg, a driver operatively associated with said throat for driving the peg from out the throat into a peg receiving hole in the work piece, and an awl operative first to punch said hole and then to feed the work so as to position the hole beneath the driver and throat, the combination of an enclosed head housing having an outer front face plate portion, a clutch operated power cam shaft supported within said housing and axially extending fore and aft in the machine, a series of conjugate power cams and cam operated levers directly associated with the cam shaft, a series of operating shafts mounted in said housing for radial rocking movement, each of said operating shafts being linked within the head housing to one of the cam operated levers and having a forward shaft end extending outward through the front face plate portion of the housing, and movable connections between each of said forward shaft ends and one of said operating means whereby a periodic rocking movement imparted by the cams to each operating shaft is transmitted respectively to each one of said operating means to thereby actuate the means in time relation to each other.

2. In a fiber fastening inserting machine having operating means including strand feeding mechanism, a driving throat operatively associated with said mechanism first to receive a length of fiber strand and then to shear the strand to form a peg, a driver operatively associated with said throat for driving the peg from out the throat into a peg receiving hole in the work piece, and an awl operative first to punch said hole and then to feed the work so as to position the hole beneath the driver and throat, the combination of an enclosed head housing having a front face plate portion on the outer side of which said means are operatively mounted, a clutch operated power cam shaft supported within said housing and axially extending fore and aft in the machine, a series of power cams and cam operated levers associated with the cam shaft, a series of operating shafts mounted in said housing for oscillatory movement about their axes parallel to the axis of the cam shaft, each of said operating shafts being linked within the housing to one of the cam operated levers and having a forward shaft end extending outward through the front face plate portion of the housing, and connecting links between each of said shaft ends and the said operating means, whereby the operating means are successively actuated in time relation to each other.

3. In a fiber fastening inserting machine having operating means including strand feeding mechanism, a driving throat operatively associated with said mechanism first to receive a length of fiber strand and then to shear the strand to form a peg, a driver operatively associated with said throat for driving the peg from out the throat into a peg receiving hole in the work piece, and an awl operative first to punch said hole and then to feed the work so as to position the hole beneath the driver and throat, the combination of a machine head frame member having a front face plate portion, a main power cam shaft rotatably mounted in said frame member and axially extending fore and aft in the machine, a series of cams and cam operated levers associated with the cam shaft, a series of operating shafts mounted in said frame member for movement about their axes parallel to the axis of the power shaft, each of said operating shafts being linked to one of the cam operated levers and having a forward shaft end extending outward through the front face plate portion of the head frame, and connecting links between each of said shaft ends and said operating means whereby a periodic rocking movement imparted by the cams to each operating shaft is transmitted respectively to each one of the said operating means to thereby actuate said means in time relation to each other.

4. In a fiber fastening inserting machine, having work operating means including a strand feeding mechanism, a movable driving throat operatively associated with said mechanism first to receive a fed length of strand and then to shear the strand to form a peg, a peg driver operatively associated with said throat for driving the peg from out an opening through the throat and into the work piece, and means for intermittently moving said throat between its strand receiving and severing position and its peg driving position, said last-mentioned means comprising a movable carrier arm to one end of which the throat is affixed, a driven wheel rotatable about a fixed axis and having an eccentric crank pin journaled in the other end of the carrier arm, a second wheel rotatably mounted and having an eccentric crank pin journaled in the carrier arm adjacent the throat end of the arm, and means for alternately driving the first-mentioned wheel about a quarter of a turn first in one direction and then in the opposite direction whereby the carrier arm and the throat are bodily moved in paths transversely to the direction of the strand to shear the strand, then arcuately downward into peg driving position, and finally returned through the same paths to strand receiving position.

5. In a fiber fastening inserting machine, having work operating means including a strand feeding mechanism, a vertical driving throat operatively associated with said mechanism first to receive a fed length of strand and then to shear the strand to form a peg, a driver operatively associated with said throat for driving the peg from out an opening through the throat and into the work piece, and means for intermittently moving said throat between its strand receiving and severing position and its peg driving position, said mentioned means comprising a movable carrier arm to one end of which the throat is affixed, said arm being operatively supported adjacent each of its ends by an eccentrically driven linkage so constructed and arranged as to maintain the throat opening vertical at all times during its movement between the strand receiving and peg driving positions.

FRANK R. THRESH.

No references cited.